US008676403B2

(12) United States Patent  (10) Patent No.: US 8,676,403 B2
Garrido-Lopez et al.  (45) Date of Patent: Mar. 18, 2014

(54) FOUR-DIMENSIONAL GUIDANCE OF AN AIRCRAFT

(75) Inventors: David Garrido-Lopez, Colmenarejo (ES); Ramon Gomez Ledesma, Madrid (ES)

(73) Assignee: The Boeing Company, Chicago, IL (US)

( * ) Notice: Subject to any disclaimer, the term of this patent is extended or adjusted under 35 U.S.C. 154(b) by 689 days.

(21) Appl. No.: 12/760,613

(22) Filed: Apr. 15, 2010

(65) Prior Publication Data

US 2010/0282916 A1 Nov. 11, 2010

(30) Foreign Application Priority Data

May 5, 2009 (EP) .................................. 09382064

(51) Int. Cl.
 *G01C 23/00* (2006.01)
(52) U.S. Cl.
 USPC .............. 701/3; 701/7; 701/122; 701/121; 244/175; 244/187; 244/180; 244/181; 244/182; 340/979; 340/973; 342/357.31
(58) Field of Classification Search
 None
 See application file for complete search history.

(56) References Cited

U.S. PATENT DOCUMENTS

| 3,945,593 | A | * | 3/1976 | Schanzer ...................... 244/181 |
| 4,490,793 | A | * | 12/1984 | Miller ............................... 701/3 |
| 4,536,843 | A | * | 8/1985 | Lambregts ......................... 701/3 |
| 4,764,872 | A | * | 8/1988 | Miller ............................... 701/3 |
| 5,051,910 | A | | 9/1991 | Liden |
| 5,079,711 | A | * | 1/1992 | Lambregts et al. ................ 701/3 |
| 5,121,325 | A | | 6/1992 | DeJonge |
| 5,722,620 | A | * | 3/1998 | Najmabadi et al. ........... 244/181 |
| 6,061,612 | A | * | 5/2000 | Sainthuile et al. ................ 701/7 |
| 6,405,107 | B1 | | 6/2002 | Derman |
| 6,507,782 | B1 | | 1/2003 | Rumbo et al. |
| 6,507,783 | B2 | * | 1/2003 | Katayama et al. ............. 701/431 |
| 7,650,232 | B1 | * | 1/2010 | Paielli ........................... 701/528 |
| 8,321,071 | B2 | * | 11/2012 | Klooster .......................... 701/3 |
| 2008/0215196 | A1 | * | 9/2008 | Deker .............................. 701/5 |
| 2010/0217461 | A1 | * | 8/2010 | Ledesma et al. ................ 701/18 |
| 2011/0251740 | A1 | * | 10/2011 | Gomez Ledesma et al. ..... 701/8 |

FOREIGN PATENT DOCUMENTS

| EP | 1962256 A1 | 8/2008 |
| EP | 2154594 A2 | 2/2010 |

OTHER PUBLICATIONS

Communication (including European Search Report), Appln. No. 09382064.5, Jul. 1, 2011.
Ledesma et al., "Continuous Descent Approaches for Maximum Predictability," Proc. 26th Digital Avionics Systems Conf., Dallas, Texas, Paper 3.A.2 (2007).

(Continued)

*Primary Examiner* — Helal A Algahaim
*Assistant Examiner* — Paul Castro
(74) *Attorney, Agent, or Firm* — Ostrager Chong Flaherty & Broitman P.C.

(57) ABSTRACT

The present invention relates to methods of controlling the flight path of an aircraft to follow as closely as possible a predetermined four-dimensional flight path, such as when flying continuous descent approaches. A method of controlling an aircraft to follow a predetermined four-dimensional flight path is provided that comprises monitoring an actual along-track position and an actual vertical position of the aircraft relative to corresponding desired positions on the predetermined flight path. Throttle commands are generated based on deviations of the actual vertical position of the aircraft from the desired vertical position. Elevator commands are generated based on the deviation of the actual along-track position from the desired along-track position and on the deviation of the actual vertical position from the desired vertical position.

17 Claims, 7 Drawing Sheets

(56) References Cited

OTHER PUBLICATIONS

Clarke et al., "Continuous Descent Approach: design and Flight Test for Louisville International Airport," J. Aircraft, vol. 41, No. 5, pp. 1054-1066 (2004).

Kaminer et al., "Integration of Four-Dimensional Guidance with Total Energy Control System," J. Guidance, vol. 14, No. 3, pp. 564-573 (1991).

Tong et al., "Descent Profile Options for Continuous Descent Arrival Procedures within 3D Path Concept," Proc. 26th Digital Avionics Systems Conf., Dallas, Texas, Paper 3.A.3 (2007).

Jackson, "Sensitivity of Trajectory Prediction in Air Traffic Management and Flight Management Systems," Section 6.4, p. 87, Doctoral Thesis, Univ. Minnesota, Dec. 1997.

Jackson, "Airborne Required Time of Arrival (RTA) Control and Integration with ATM," 2007 AIAA ATIO Conference, Sep. 2007.

* cited by examiner

FOUR-DIMENSIONAL GUIDANCE OF AN AIRCRAFT

RELATED PATENT APPLICATION

This application claims priority from European Patent Application No. 09382064.5 filed on May 5, 2009.

FIELD OF THE INVENTION

The present invention relates to methods of controlling the flight path of an aircraft to follow as closely as possible a predetermined four-dimensional flight path. The present invention is particularly useful in flying continuous descent approaches.

BACKGROUND

Flight paths are generally calculated in three dimensions, i.e., altitude and lateral position. To calculate a flight path in four dimensions requires the three-dimensional position of the aircraft to be specified over a number of points in time.

The ability to fly an aircraft according to a predetermined flight path with accuracy such that its position as a function of time is predictable is becoming increasingly important in air traffic control. This would allow air traffic control to relax separations between aircraft, leading to more efficient use of air space.

Although applicable to all phases of aircraft flight, one area that could particularly benefit from an enhanced ability to fly a four-dimensional flight path is in aircraft flying continuous descent approaches into airports. Typically, aircraft will approach an airport under the guidance of air traffic controllers. The air traffic controllers are tasked with ensuring the safe arrival of aircraft at their destination, while also ensuring the capacity of the airport is maximised. The former requirement is generally met by ensuring minimum specified separations are maintained between aircraft. Air traffic control is subject to uncertainties that may act to erode the separation between aircraft such as variable winds, both in speed and direction, and different piloting practices. Nonetheless, large numbers of aircraft can operate safely confined in a relatively small space since air traffic control can correct for these uncertainties at a tactical level using radar vectoring, velocity change and/or altitude change. As a result, a typical approach to an airport will involve a stepped approach where the aircraft is cleared to descend in steps to successively lower altitudes as other air traffic allows.

Air traffic noise around airports has important social, political and economic consequences for airport authorities, airlines and communities. An affordable way to tackle the noise problem in the vicinity of airports is to develop new guidance procedures that reduce the number of aircraft that fly over sensitive areas at low altitude with high thrust settings and/or with non-clean aerodynamic configurations (e.g. with landing gear and/or flaps deployed). Unfortunately, conventional step-down approaches act to exacerbate this problem as aircraft are held at low altitudes, where engine thrust must be sufficient to maintain level flight.

Continuous descent approaches (CDAs) are well known. These approaches see the aircraft approach an airport by descending continuously with the engines set to idle or close to idle. Clearly, continuous descent approaches are highly beneficial in terms of noise reduction as they ensure that aircraft are kept as high as possible above sensitive areas while at the same time reducing the noise production at the source through optimum use of the engine and flaps. Continuous descent approaches also benefit fuel efficiency, emission of pollutants and reduce flight time.

However, continuous descent approaches must be planned in detail before commencing the approach and cannot be subjected to tactical corrections to ensure safe aircraft separation like those used in conventional step-down approaches. To date this has obliged air traffic controllers to impose large spacings between aircraft to guarantee that the aircraft arrive at the airport separated by a safe distance, bearing in mind the potential for reduction in aircraft spacing as approaches are flown due to a result of wind changes and other uncertainties. Such an increase in separation results in an undesirable reduction in airport capacity.

The capacity penalty associated with continuous descent approaches has prevented their widespread use in airports and, to date, continuous descent approaches have mostly been used at airports with low levels of air traffic or at busier airports during quiet times (e.g. at night). Thus, it is desirable to be able to fly continuous descent approaches that minimise uncertainties in the four-dimensional position history of the aircraft. This would allow air traffic controllers to reduce safely the spacing between aircraft, thus satisfying the capacity needs of modern airports.

SUMMARY

Against this background, a first aspect of the present invention resides in a method of guiding an aircraft to follow a predetermined four-dimensional flight path, comprising monitoring an actual along-track position and an actual vertical position of the aircraft relative to corresponding desired positions on the predetermined flight path, generating throttle commands based on deviations of the actual vertical position of the aircraft from the desired vertical position, and generating elevator commands based on the deviation of the actual along-track position from the desired along-track position and on the deviation of the actual vertical position from the desired vertical position. The deviation in along-track position may be used in generating the elevator commands alone (i.e., not in generating the throttle commands). This method is primarily designed to be a vertical navigation method of the aircraft automatically commanded by a flight management computer.

The throttle commands may then be used to control the throttle(s) of the aircraft, i.e., to adjust the thrust produced from the engines. Also, the elevator commands may be used to control the elevator(s) of the aircraft, i.e., to adjust the pitch of the aircraft.

The deviation in along-track position may be calculated in at least two ways. This deviation may be represented as the spatial difference between the actual and desired along-track positions at a particular point in time, i.e., as a distance error. Alternatively, this deviation may be represented as the time difference between when the aircraft actually reaches a point on the predetermined path time as compared to the desired time of reaching that point, i.e., how early or late the aircraft is to reach its current position. Either error is to be considered as representing the deviation of the along-track position from the desired along-track position.

Previously, it has been proposed to control along-track position using throttle commands and to control vertical position using elevator commands, for example see U.S. Pat. Nos. 6,507,783 and 4,536,843. At face value, this seems sensible as vertical deviations are effectively controlled by elevator, ensuring optimal vertical situation awareness and straightforward compliance with altitude constraints. While U.S. Pat. No. 4,764,872 introduces the idea of simultaneously controlling vertical speed and airspeed by supplying the vertical speed command to the autothrottle system and the airspeed command to the autopilot pitch channel, the present invention appears to turn the more common use of elevators and throttle commands on its head, as elevator commands are used herein to correct deviations in along-track position.

By using elevator commands to control deviations in along track position rather than only using throttle commands, a major benefit results in that the response time of the aircraft to a change in elevator command is typically quicker than the response time of the aircraft to a change in throttle command. As a result, the actual along-track position can be constrained to follow the desired along-track position very closely.

In effect, elevator control is used to correct errors in tracking the desired along-track position by transferring the error to the vertical position. By trading kinetic energy for potential energy in this way, undesired kinetic energy can momentarily be stored in the form of potential energy that, if needed, can be converted back eventually into kinetic energy by elevator actuations. This way, the accuracy of the vertical position is sacrificed to the benefit of accuracy in the along-track position, with enhanced efficiency as the undesired kinetic energy is stored for later use as opposed to dissipated with additional drag, as in previous methods.

It has been found beneficial to provide primary control of the along-track position. Control of the along-track position is achieved using the elevator(s) and without adjusting the throttle(s) because the deviation of along-track position is used in calculating the elevator commands only. Hence, the primary correction is one of a change in elevator command. To reduce the number of changes in throttle commands, it is preferred that the throttle commands are produced only when the deviation of the vertical position exceeds a threshold. Further details of the thresholds that may be used are given below. Using a threshold means that, should the elevator adjustment lead to the vertical position deviation exceeding the threshold, then throttle commands are used to control the vertical position. However, rather than trying to correct errors in the vertical position continuously, deviations in the vertical position are tolerated. These small errors are monitored and may indeed stay within tolerable values of their own accord. Nonetheless, should the errors continue to grow, the throttle(s) may be used to reduce the error. This is achieved by changing the throttle setting only once the actual vertical position deviates from the desired vertical position by more than the threshold amount. In this way, the aircraft can be flown without the need for continuous or even frequent changes to the thrust setting, thereby saving wear and tear of the engine and providing fuel savings. It also provides an effective way of decoupling elevator and throttle control. It has been proven that small corrections of the throttle settings around near-idle thrust values are sufficient to ensure a reasonable vertical confinement of the trajectory.

Elevator commands could be generated based upon deviations in along-track position and ignoring deviations in vertical position. In fact, this has been found to work well where a reasonable tolerance is allowed for deviations in vertical position. However, it has been found that an improvement may be made and this pays particular benefit where there is a greater requirement for the tolerance in deviations in vertical position.

This is because of the slow response time met with throttle commands, i.e., once a new throttle command arises, there is a delay in the engines responding to produce the thrust corresponding to the new throttle setting, and then there is a further delay in the response of the aircraft to the altered throttle setting. This slow response time can be accommodated where in circumstances where there are relaxed vertical position tolerances. However, the slow response times mean that upper and lower thresholds to deviations in vertical position may be repeatedly crossed leading to an oscillatory motion of the aircraft. Although this will not lead to a lack of control, it produces undesirable numbers of throttle changes. This leads to increased wear and tear of the engines and decreased fuel economy.

The improvement according to the present invention sees the elevator command being generated not just based on the deviation of the actual along-track position from the desired along-track position, but on a combination of the along-track position and the deviation of the actual vertical position from the desired vertical position. In effect, this returns some of the potential error that would otherwise be passed to a deviation in vertical position back to the kinetic energy error in along track position. Hence, some accuracy in along-track position is sacrificed to achieve improved vertical position accuracy so as to meet tighter vertical position requirements.

The elevator commands may be generated based on weighted combinations of the deviations in along-track position and vertical position. Hence, different weights may be given to the contribution from deviations in along-track position and vertical position. This allows a relatively small weighting to be given to the deviation in vertical position, such that deviations in along-track position are allowed to dominate. Thus, control may still be primarily driven to reduce deviations in along-track position.

Having different weights also allows fine tuning of the performance of the guidance system. For example, the method may be tuned to meet a certain vertical position tolerance requirement by weighting the deviation in vertical position contribution relative to the deviation in along-track position accordingly. Thus, just enough accuracy in the along-track position may be sacrificed to meet the vertical position accuracy requirement.

Optionally, the method may further comprise monitoring the deviation of the actual ground speed of the aircraft relative to a desired ground speed, and adding another term proportional to the ground speed deviation to the weighted combination of deviations in which elevator commands are based. Thus, a term is introduced into the elevator command determination to improve tracking of the desired ground speed. A guidance system results that seeks to minimise a combination of deviations in the along-track position, ground speed and vertical position. As the deviation in ground speed feeds into the elevator command, it forms part of the primary control and may take precedence over deviations in vertical position. As already described above, precedence may also be promoted by generating elevator commands based on weighted combinations of the deviations in along-track position, vertical position and ground speed. The advantages of using weighted contributions, where the weights of all three contributions may be varied relative to each other, is as already described above.

Optionally, the method comprises using an autopilot to modify a calibrated airspeed elevator command based on the deviations of the actual along-track position from the desired along-track position and the actual vertical position from the desired vertical position and, optionally, the actual ground speed from the desired ground speed. The terms may be weighted, in much the same way as described above.

As mentioned above, the method may comprise generating throttle commands based on deviations of the actual vertical position of the aircraft from the desired vertical position when the actual vertical position differs from the desired vertical position by more than a threshold. The throttle commands may be used to alter the throttle setting from a nominal value to an adjusted value. The threshold may be variable such that it is dependent upon the altitude of the aircraft. For example, the threshold may vary such that it increases with increasing altitude.

Optionally, generating throttle commands and using the throttle commands to alter the throttle setting may comprise increasing the throttle setting from a nominal value to a higher value when the actual vertical position falls below the desired vertical position by a first threshold, and decreasing the throttle setting from the nominal value to a lower value when the actual vertical position rises above the desired vertical position by a second threshold. The higher and lower values of the throttle setting may be offset from the nominal value by a common amount. The first and/or second threshold may vary with altitude.

Using thresholds that vary with altitude may benefit efficiency of the method, and also flight safety. For instance, the first threshold and/or the second threshold may be set to be larger at a second altitude than they are at a first, lower altitude. In this way, the thresholds may be set to be larger at high altitudes where there is no potential conflict with other airways, and the thresholds may be reduced, e.g. progressively reduced at lower altitudes, which optimises engine use. This may comprise having a continuously variable threshold or banded thresholds, i.e., thresholds taking a certain value in a number of different altitude ranges.

More than a pair of thresholds may be used. For example, two or more thresholds may be used to set throttle levels either above or below the nominal setting (or both above and below), with appropriate altered throttle settings assigned for each threshold. For example, a threshold indicating a larger deviation above the desired vertical position may lead to a more reduced thrust setting than a threshold indicating a smaller deviation.

After adjusting the throttle setting, the throttle setting may remain at the higher or lower value. While the throttle setting is in this altered state, the method may further comprise continuing to monitor the actual along-track position and the actual vertical position of the aircraft relative to the corresponding desired positions on the predetermined flight path; and generating throttle commands and using the throttle commands to return the throttle setting to the nominal value once the actual vertical position of the aircraft corresponds to the desired vertical position. Consequently, the aircraft's throttle setting is merely changed once to the higher or lower setting and left in that setting until the error has been removed from the vertical position. Once the error is corrected, the throttle setting is merely returned to the nominal value. Advantageously, this results in less frequent changes to the throttle setting.

The nominal throttle setting may be decided beforehand in order to perform the guidance reference calculations. The nominal throttle setting is not necessarily a fixed value, but may vary along the planned flight in order to meet constraints. For instance, the nominal throttle setting may take different values for different segments of a descent in order to meet given altitude and/or speed constraints.

The altered throttle settings may be pre-determined for a given aircraft or may be calculated on-the-fly. For instance, depending on current gross weight and current flight path angle error, an altered throttle setting may be calculated from the nominal throttle setting so as to ensure that the aircraft will cancel out its vertical deviation in a given amount of time assuming that conditions do not change significantly. Hence, the method may comprise calculating the necessary adjusted value of the throttle setting to achieve the desired vertical position. Preferably, calculations of throttle commands are limited such that the throttle setting is kept within limits. For instance, a lower throttle level limit may be set equal to the idle engine level.

Optionally, the method may comprise generating throttle commands based on predictions of deviations of the actual vertical position of the aircraft from the desired vertical position. For example, the method may comprise repeatedly calculating a predicted deviation in vertical position by: calculating the current deviation of actual vertical position from the desired vertical position, calculating the rate of change of the deviation in vertical position, multiplying the rate of change by a prediction time span, and adding the so-multiplied rate of change to the current deviation in vertical position thereby obtaining the predicted deviation in vertical position; and generating a throttle command based on the predicted deviation in vertical position. The prediction time span may be chosen appropriately. Five seconds has been found to work well. With such a prediction time span, the method effectively predicts the deviation in vertical position in five seconds time. This mitigates against the slow response time of the aircraft to throttle commands, and provides a better response in the aircraft's behaviour (e.g. this also helps remove the oscillatory motion of the aircraft around the guidance reference described above that can arise when tight vertical position tolerances are followed).

Many different approaches to generating elevator commands may be adopted without departing from the scope of the present invention. For example, the deviations between in along-track position and vertical position (and, optionally, ground speed) may be monitored and any deviation (no matter how small) or any deviation in a weighted combination of these deviations (no matter how small), may be corrected by an appropriate elevator command. Alternatively, thresholds may be introduced, such that a command to move the elevator(s) arises only when the deviation exceeds a threshold. The threshold may be set quite low relative to the thresholds for the throttle commands to ensure that elevator control is invoked in preference to throttle control. Furthermore, the deviation of the actual along-track position from the desired along-track position may be monitored continuously or at intervals. The intervals may be set as desired.

Issuing elevator commands causes the attitude of the aircraft to change. For example, if the aircraft has been found to have traveled too far along-track, the elevator commands are used to pitch up the nose of the aircraft thereby decreasing the ground speed of the aircraft and causing the aircraft's progress along-track to slow down. The elevator command may be implemented in many different ways. For example, commands may be sent to the elevator(s) to alter the pitch of the aircraft by a set increment. Alternatively, an elevator command may arise that causes a change in the pitch of the aircraft that depends on the size of the deviations. As mentioned above, calibrated air speed (CAS) commands may be generated and provided to the autopilot. The autopilot subsequently generates the necessary elevator commands using the CAS commands. The CAS commands necessary to cancel out along-track position errors may be computed as a function of ground speed error, along-track position error, and current calibrated airspeed (along with additional flight data such as air thermodynamic state and wind data).

In any of the above arrangements, the changes in aircraft configuration arising from elevator settings and throttle settings may be made with respect to other safety features of the aircraft. For example, any throttle setting may be modified so as to ensure that the airspeed of the aircraft stays within safe or approved limits, for instance to avoid overspeed, underspeed or stall conditions. Hence, the method may comprise ensuring the CAS commands remain within an upper and lower bound. This may be done by capping the CAS command to an upper value if it would otherwise exceed that value, and limiting the CAS command to a lower value if it would otherwise fall below that value. Also, elevator settings may be modified to ensure that the pitch of the aircraft stays within safe or approved limits, for instance to avoid exceeding a stall angle.

A further safety feature may be included. The method may comprise reverting to a vertically constrained flight path should the deviation in vertical position exceed a preset threshold. This may allow a threshold to be set to meet a required navigation performance (RNP) for a continuous approach descent. Should the aircraft exceed this RNP, the above described control law may be abandoned in favour of adopting a vertically constrained flight path (at the expense of predictability and thus usually leading to more significant deviations from the predetermined four-dimensional flight path).

The present invention also resides in a flight control computer programmed to implement any of the methods described above. In addition, the present invention resides in an aircraft having such a flight control computer. The flight control computer may be located in or near the cockpit of the aircraft. The present invention also resides in a computer program that, when executed, implements any of the methods described above.

BRIEF DESCRIPTION OF THE DRAWINGS

In order that the present invention may be more readily understood, preferred embodiments will now be described, by way of example only, with reference to the following drawings in which.

DETAILED DESCRIPTION

Figure 1:
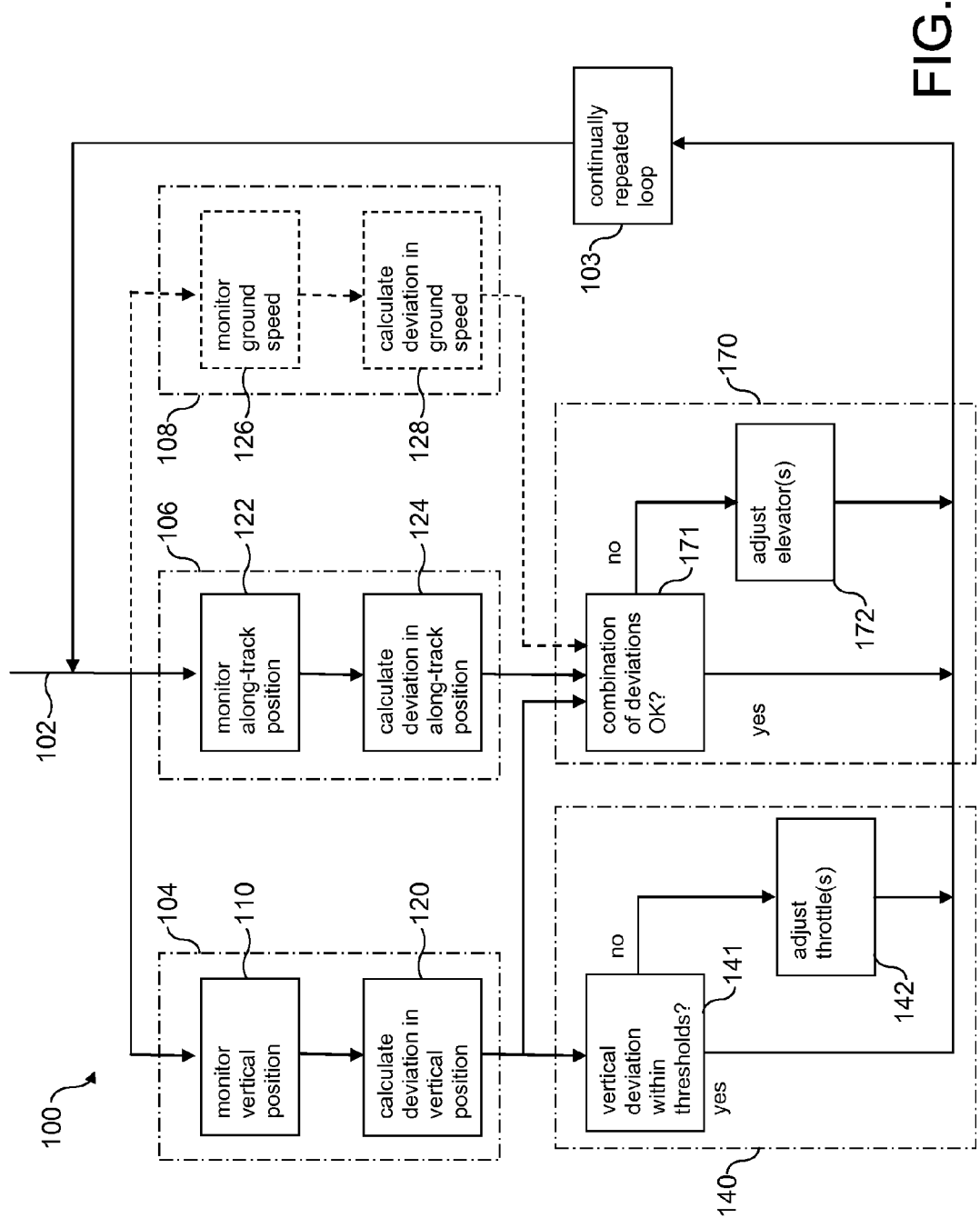
FIG. 1 is a schematic block diagram of a method of controlling the flight path of an aircraft according to a first embodiment of the present invention.

A method of controlling an aircraft 200 (FIG. 2) to follow a predetermined four-dimensional flight path is shown at 100 in FIG. 1. The method begins at 102 and proceeds in parallel to two processes, 104 and 106. An optional third parallel process is shown at 108.

Parallel process 104 is concerned with the vertical position of the aircraft 200, parallel process 106 is concerned with the along-track position of the aircraft 200, and parallel process 108 is concerned with the ground speed of the aircraft 200. An indicated by the dashed lines, the third parallel process 108 is optional, i.e., the method shown in FIG. 1 may be practiced with a consideration of the vertical position and along-track position alone. In the following description, it will be assumed that the ground speed is considered.

Figure 2A:
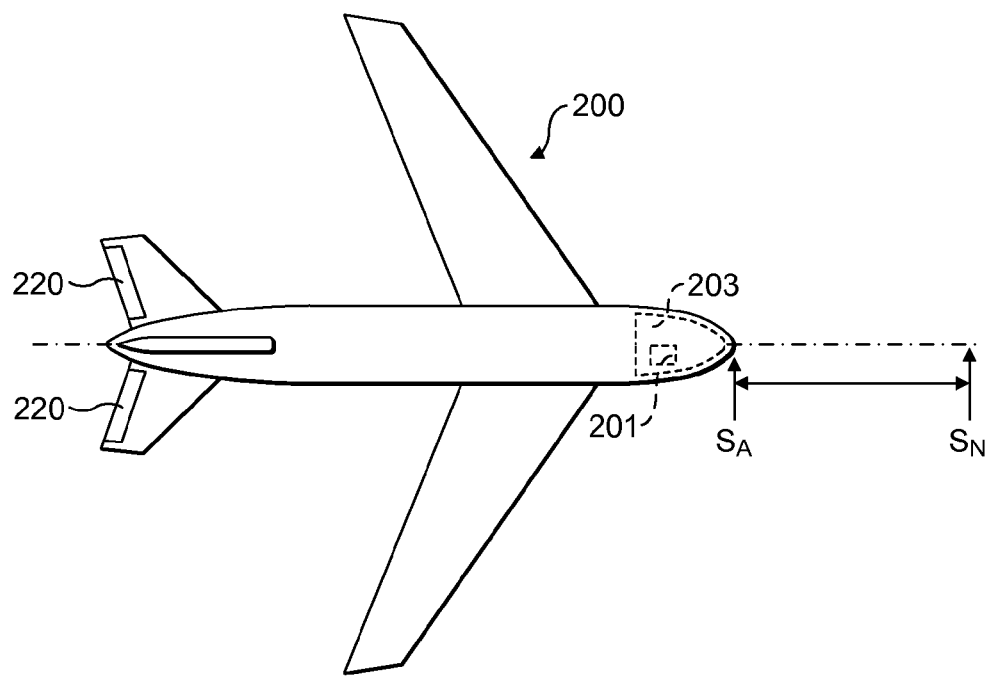
FIG. 2a is a side view of the aircraft illustrating its vertical position.

The parallel process 104 that is concerned with the vertical position of the aircraft 200 will be considered first. The vertical position of an aircraft 200 is illustrated in FIG. 2a. At 110, the aircraft's vertical position is monitored. That is to say, the current vertical position of the aircraft 200 is determined. The vertical position may be monitored so that its value is determined every 0.1 seconds, for example. Preferably, the vertical position is monitored of the order of once per second or faster. At 120, the determined vertical position is compared to the desired vertical position at that time to establish the deviation in vertical position.

Figure 2B:
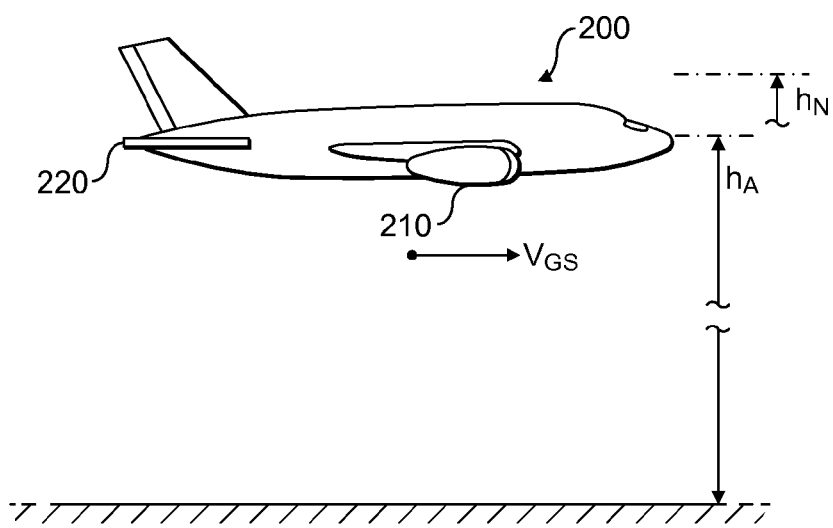
FIG. 2b is a top view of an aircraft illustrating its along-track position.

In the second parallel process 106, the along-track position of the aircraft 200 is monitored at 122. The along-track position of the aircraft 200 is illustrated in FIG. 2b. That is to say, the current along-track position of the aircraft 200 is determined. This may be monitored so that its value is determined every 0.1 seconds, for example. Preferably, the along-track position is monitored of the order of once per second or faster. At 124, the determined along-track position is compared to the desired along-track position for that time and the deviation in along track position is determined.

In the third parallel process 108, the ground speed position of the aircraft 200 is monitored at 126. The ground speed of the aircraft 200 is illustrated in FIG. 2a. This may be monitored so that its value is determined every 0.1 seconds, for example. Preferably, the ground speed is monitored of the order of once per second or faster. At 128, the determined ground speed is compared to the desired ground speed for that time (or position) and the deviation in ground speed is determined.

The deviations in vertical position, along-track position and ground speed found at steps 120, 124 and 128 are used in two parallel processes 140 and 170.

An adjust throttle(s) process 140 starts at step 141 where the deviation in vertical position calculated at step 120 is received. As step 141, the deviation in vertical position is assessed to see whether or not it is acceptable. For example, the deviation in vertical position is compared to upper and lower limits corresponding to upper and lower throttle-change thresholds. The upper and lower throttle-change thresholds may be set to the same or different values. For example, both thresholds may be set to 100 feet.

If the deviation in vertical position is found to be within the thresholds, the method follows a return loop 103 to return to monitoring processes 104, 106 and 108. The return loop 103 ensures that the method 100 executes continually, i.e., repeatedly loops over a specified time. For example, the method 100 may repeat all the while the aircraft 200 is performing a continuous descent approach. The return loop 103 may include means to ensure that the pair of parallel processes 140 and 170 remain in time, i.e., that both processes are completed before the next iteration begins.

Returning to the consideration of vertical deviation at step 141, if the deviation in vertical position is found to be outside a throttle-change threshold, the method continues to an adjust throttle(s) procedure at 142. The adjust throttle(s) procedure 142 sees the throttle setting adjusted in response to the deviation in vertical position, to vary the thrust level of the engines 210. For example, if the deviation is found to indicate that the aircraft 200 is too high, the throttle setting is reduced. The response of the aircraft 200 is then monitored and the throttle setting is returned to the nominal setting once the actual vertical position returns to the desired vertical position, as will be described in more detail below. Once the adjust throttle(s) procedure at 142 has completed, the method continues to the return loop 103.

An adjust elevator(s) process 170 starts at step 171 where all three deviations are received from steps 120, 122 and 126. At step 171, the vertical position, along-track and ground speed deviations are checked to determine whether or not a deviation resulting from a combination of these three deviations is within acceptable values. Alternatively, the three deviations may be checked separately to determine whether any of the deviations are unacceptable. If the combined deviations is found to be acceptable, the method repeats via return loop 103. On the other hand, if the combined deviation is found not to be acceptable, the method continues to an adjust elevator(s) procedure at 172.

At 172, a command is generated to adjust the setting of the elevator(s) 220 so as to correct the unacceptable combined deviation. For example, if the aircraft 200 is found to have progressed too far along-track, an elevator command is generated to cause the nose of the aircraft 200 to pitch up. Once the elevator command has been generated at 172, the method continues to return loop 103.

Figure 3:
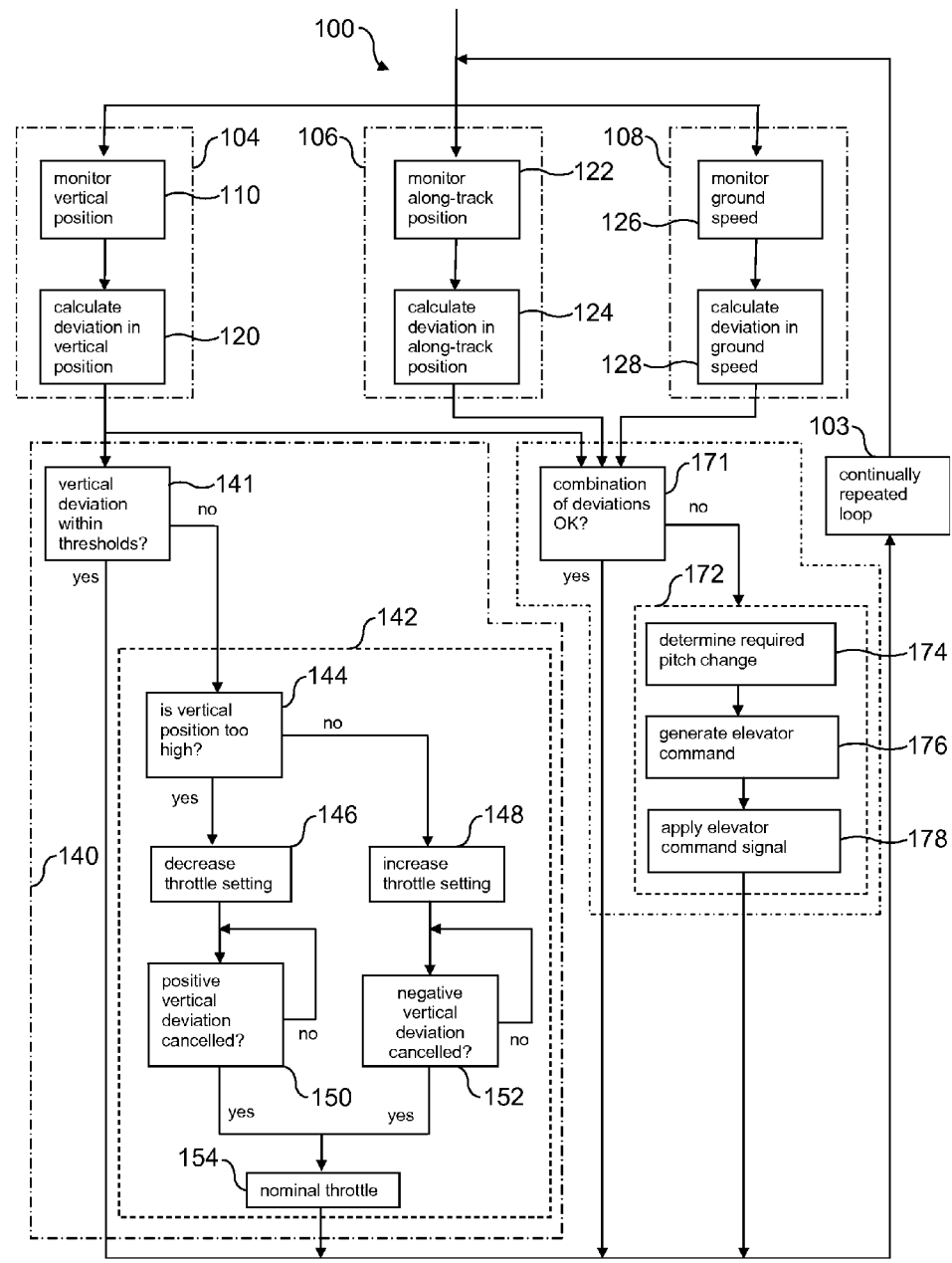
FIG. 3 is a schematic block diagram of a method of controlling the flight path of an aircraft according to a second embodiment of the present invention.

FIG. 3 corresponds broadly to FIG. 1, and like parts are denoted with like reference numerals. The optional ground speed process 108 is included in this Figure, although it will be understood that it may be omitted. In essence, FIG. 3 shows the adjust throttle(s) procedure 142 and the adjust elevator(s) procedure 172 in more detail than FIG. 1.

With respect to the adjust throttle(s) procedure 142, a determination of whether the vertical position is too high is made at 144. If the answer is yes, the throttle setting is decreased from the nominal setting to a lower value at 146. If the answer is no, the throttle setting is increased from the nominal setting to a higher value at 148. However implemented, the throttle settings may correspond to idle thrust at the lower setting, idle thrust+1000 lbf (for each engine) for the nominal setting and idle thrust+2000 lbf for the upper setting, for instance. In a typical mid-size passenger jet, such changes in thrust are likely to cause a change in flight path angle of less than one degree. Also, these thrust changes should be able to accommodate wind error intensities up to the order of 50 knots. This tolerance applies to straight flight, and is much reduced for turns. The effects of wind errors when making turns can be mitigated by keeping the turn radius as large as possible. Temperature errors will also cause a deviation in vertical position.

If the throttle setting has been changed to the lower position at 146, the method continues at 150 where the deviation from the vertical position is determined once more. In this instance, a determination that the positive vertical position error has been removed is required (rather than merely dropping within the throttle-change thresholds). A practical way to verify this is to ask whether the aircraft 200 vertical position deviation returns to zero or negative values. If the aircraft 200 is found still to have a positive deviation in vertical position, the determination of whether the vertical position is acceptable is answered negatively and the method loops back to the determination at 150 as shown. This loop continues until the positive deviation of the vertical position is found to have been cancelled, at which point the method proceeds to step 154 where the throttle setting is returned to the nominal setting. With this change made, the method continues to the return loop 103.

If the throttle setting has been changed to the upper position at 148, the method continues from step 148 to step 152 where the deviation from the vertical position is determined. In this instance, a determination that the negative vertical position error has been removed is required (rather than merely dropping within the throttle-change thresholds). A practical way to verify this is to ask whether the aircraft's vertical position deviation returns to zero or positive values. If the aircraft 200 is found still to have a negative deviation in vertical position, the determination of whether the vertical position is acceptable is answered negatively and the method loops back to the determination at 152 as shown. This loop continues until the negative deviation of the vertical position is found to have been cancelled, in which case the method proceeds to step 154 where the throttle setting is returned to the nominal setting. With this change made, the method continues to the return loop 103.

Turning now to the adjust elevator(s) procedure 172, it starts at 174 where the required pitch change is determined. While the elevator command may be generated in a number of ways, in this embodiment the command is generated to cause an increase or decrease in the aircraft's pitch that depends directly on the unacceptable combined deviation. Thus, where a large deviation exists, an elevator command is generated that sees a larger change in the pitch of the aircraft 200 result. Thus, the required change in pitch is determined for the unacceptable combined deviation(s). This may be determined using a look-up table, equation, or any other well-known method. The combined deviation may be formed in any well-known way, e.g. as an addition or a weighted combination.

At 176, the required change in pitch angle determined at 174 is used to generate an appropriate elevator command signal. For example, the size of elevator deflection may be calculated. The so-generated elevator command signal is applied at step 178 for an appropriate length of time to cause the required change in pitch. Thus, the deflection of the elevator(s) 220 changes and the pitch of the aircraft 200 responds to adopt the desired pitch angle. Ensuring the correct pitch angle is reached may be effected in any number of common ways, such as using a feedback loop to control the elevator deflection. With the aircraft 200 set to the desired pitch attitude, the method proceeds to return leg 103, as described above.

Figure 4:
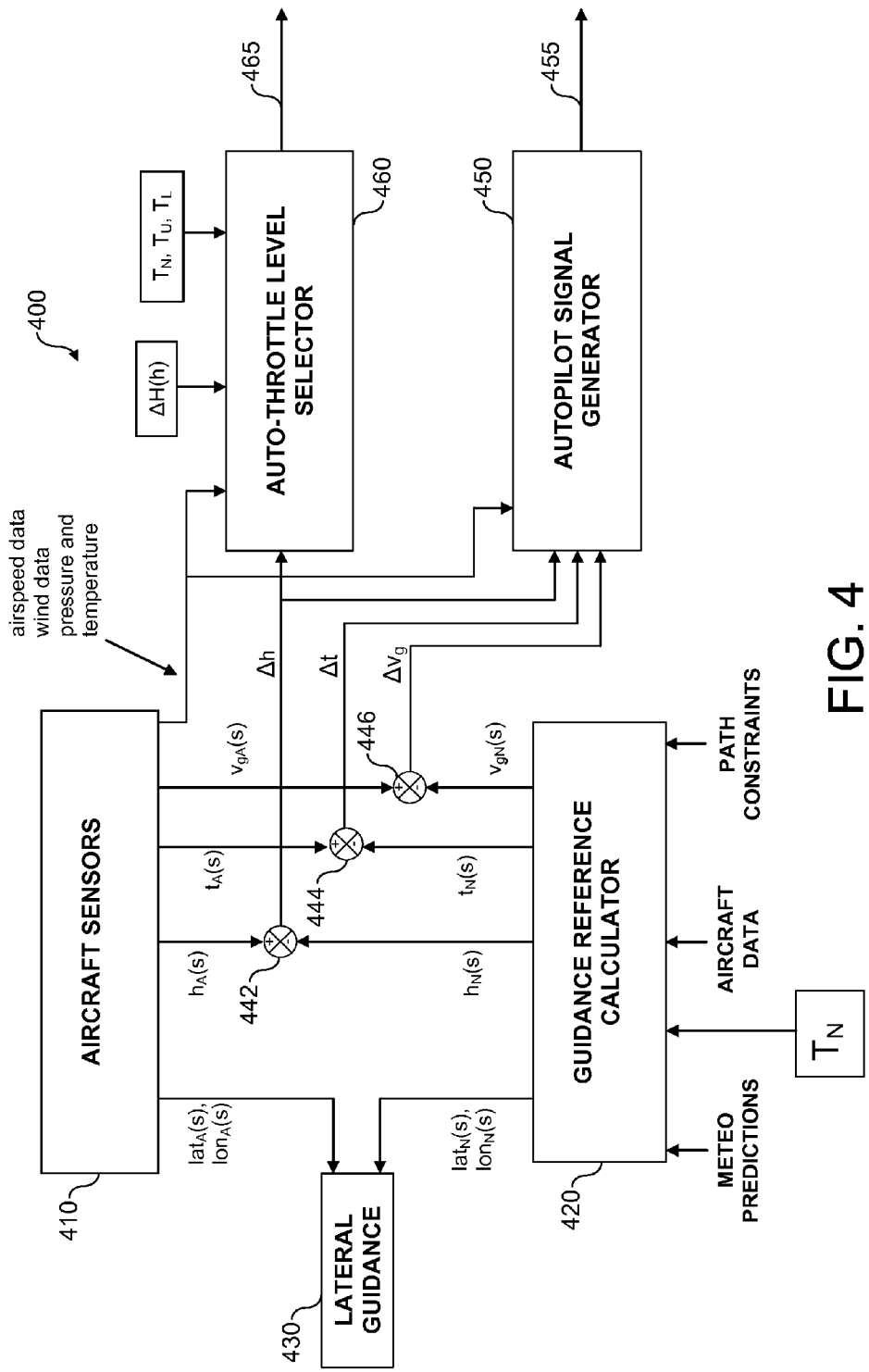
FIG. 4 is a schematic diagram of apparatus operable to control the flight path of an aircraft according to an embodiment of the present invention.

Now that methods of controlling the flight path of an aircraft 200 have been described, systems arranged for putting those methods into effect will be described. FIG. 4 is a schematic representation of one such system 400. As previously described, the invention may reside in a flight control computer 201 that is programmed to implement any of the methods and is located in or near the cockpit 203 of the aircraft 200 (see FIG. 2).

Aircraft sensors provide data indicative of the position and speed of aircraft 200 to aircraft sensors block 410. For example, the sensors may comprise GPS sensors, inertial navigation systems, altimeters, accelerometers, pressure sensors, etc. The data provided by sensors is used by the aircraft sensors block 410 to generate actual positional information signals for use by other parts within the aircraft 200.

In addition, a guidance reference calculator block 420 is used to generate a nominal four-dimensional flight path to be followed by the aircraft 200. In order to calculate the flight path, the guidance reference calculator block 420 receives a number of inputs including, for example, the pilot's intentions, data relating to performance of the aircraft 200, prevailing and predicted meteorological conditions and path constraints. The aircraft data may include weight, and aerodynamic and propulsive performance. Meteorological conditions may include temperature, pressure and wind profiles. Path constraints may include waypoints, speed and altitude constraints and a cost index. These inputs are used to determine the nominal four-dimensional flight path, and thence to provide desired positional information signals for use by other parts of the aircraft 200.

Dealing first with lateral guidance, the aircraft sensors block 410 generates signals indicating the actual latitude $lat_A(s)$ and the actual longitude $lon_A(s)$ for the current point in time. These signals are provided to a lateral guidance block 430. In addition, the guidance reference calculator block 420 generates signals indicating the desired latitude $lat_N(s)$ and the desired longitude $lon_N(s)$ for the current point in time. The lateral guidance block 430 compares the actual latitude and longitude of the aircraft 200 to the desired values, and uses the control surfaces of the aircraft 200 to follow the nominal lateral path in conventional fashion. Due to the conventional nature of this part of the system, it will not be described further.

Turning now to control of the elevator(s), the actual arrival time at the current along-track position $t_A(s)$, the actual vertical position $h_A(s)$ and the actual ground speed $v_{gA}(s)$ are generated by the aircraft sensors block 410, and the arrival time $t_N(s)$, the desired vertical position $h_N(s)$ and the desired ground speed $v_{gN}(s)$ at the current along track position are generated by the guidance reference calculator block 420. The differences between the respective actual and desired values are found at subtractors 442, 444 and 446 to produce a vertical position error $\Delta h$, a time error $\Delta t$ and a ground speed error $\Delta v_g$ respectively. The error signals $\Delta h$, $\Delta t$ and $\Delta v_g$ are provided to an autopilot signal generator 450.

The autopilot signal generator 450 takes the error signals, $\Delta h$, $\Delta t$ and $\Delta v_g$, and calculates the required change in the aircraft CAS to correct the errors. This may be achieved, for example, using a feedback control system that receives vertical position error, time error, ground speed error, and current airspeed as inputs, as well as additional flight data that may be necessary for the calculations such as air thermodynamic state and wind data, and in turn calculates corrections to CAS. With the corrected CAS determined, the autopilot signal generator 450 generates a signal 455 representing this CAS and provides it to the autopilot. Then, in conventional fashion, the autopilot responds to the change in CAS signal 455 by commanding actuations of the elevator(s) 220 until the requested CAS is realised.

The autopilot signal generator 450 may receive the aforementioned errors, or in an alternative embodiment, the autopilot signal generator may receive along-track position errors as a function time $\Delta s(t)$, i.e., the spatial difference between the actual and desired along-track positions at a particular point in time. Also, ground speed errors may be received as a function of time, $\Delta v_g(t)$. Additionally, the autopilot signal generator 450 may receive CAS, or any other variable that unambiguously determines the current airspeed of the aircraft 200, as well as additional flight data that may be necessary for the calculations such as air thermodynamic state and wind data.

Turning now to the vertical position, the aircraft sensors block 410 provides a signal $h_A(s)$ representing the actual vertical position of the aircraft 200 at the current along-track position and the guidance reference calculator block 420 provides a signal $h_N(s)$ representing the desired vertical position of the aircraft 200 at the current along-track position. These signals are provided to a subtractor 442 that subtracts one from the other to produce a vertical position error signal $\Delta h$. This error signal $\Delta h$ is provided to an auto-throttle level selector 460. The auto-throttle level selector 460 received further inputs corresponding to a throttle-change threshold value $\Delta H(h)$, the nominal throttle setting $T_N$, and the upper and lower throttle settings $T_U$ and $T_L$.

The auto-throttle level selector 460 compares the magnitude of the error signal $\Delta h$ to the throttle-change threshold $\Delta H(h)$. If the magnitude of the error signal $\Delta h$ exceeds the throttle change-threshold $\Delta H(h)$ and the error signal $\Delta h$ is positive, this implies that the aircraft 200 is too high and the auto-throttle level selector 460 responds by generating an auto-throttle signal 465 corresponding to the lower throttle setting $T_L$. If the magnitude of the error signal $\Delta h$ exceeds the throttle-change threshold $\Delta H(h)$ and the error signal $\Delta h$ is negative, this implies that the aircraft 200 is too low and the auto-throttle level selector 460 responds by generating an auto-throttle signal 465 corresponding to the upper throttle setting $T_U$.

Whenever the auto-throttle level selector 460 is producing either the upper or lower throttle setting $T_U$, $T_L$ as the auto-throttle signal 465, the auto-throttle level selector 460 reverts to monitoring the error signal $\Delta h$ to establish when it reaches zero. Once zero is reached, the auto-throttle signal 465 changes to match the nominal throttle setting $T_N$.

Although not shown, the arrangement of FIG. 4 may include override features to ensure that the safety of the aircraft 200 is not compromised. For example, the auto-throttle signal 465 and the elevator signal 455 may be filtered through a safety block that ensures that the values remain within safe limits. For example, the values may be checked to ensure that the resulting pitch angle remains within safe limits for the aircraft 200 in its current configuration, that the engines remain operating within recommended limits, or that a change in engine thrust and/or a given elevator command will not cause the airspeed of the aircraft 200 to depart from safe limits. Further details regarding such systems follow.

Figure 5:
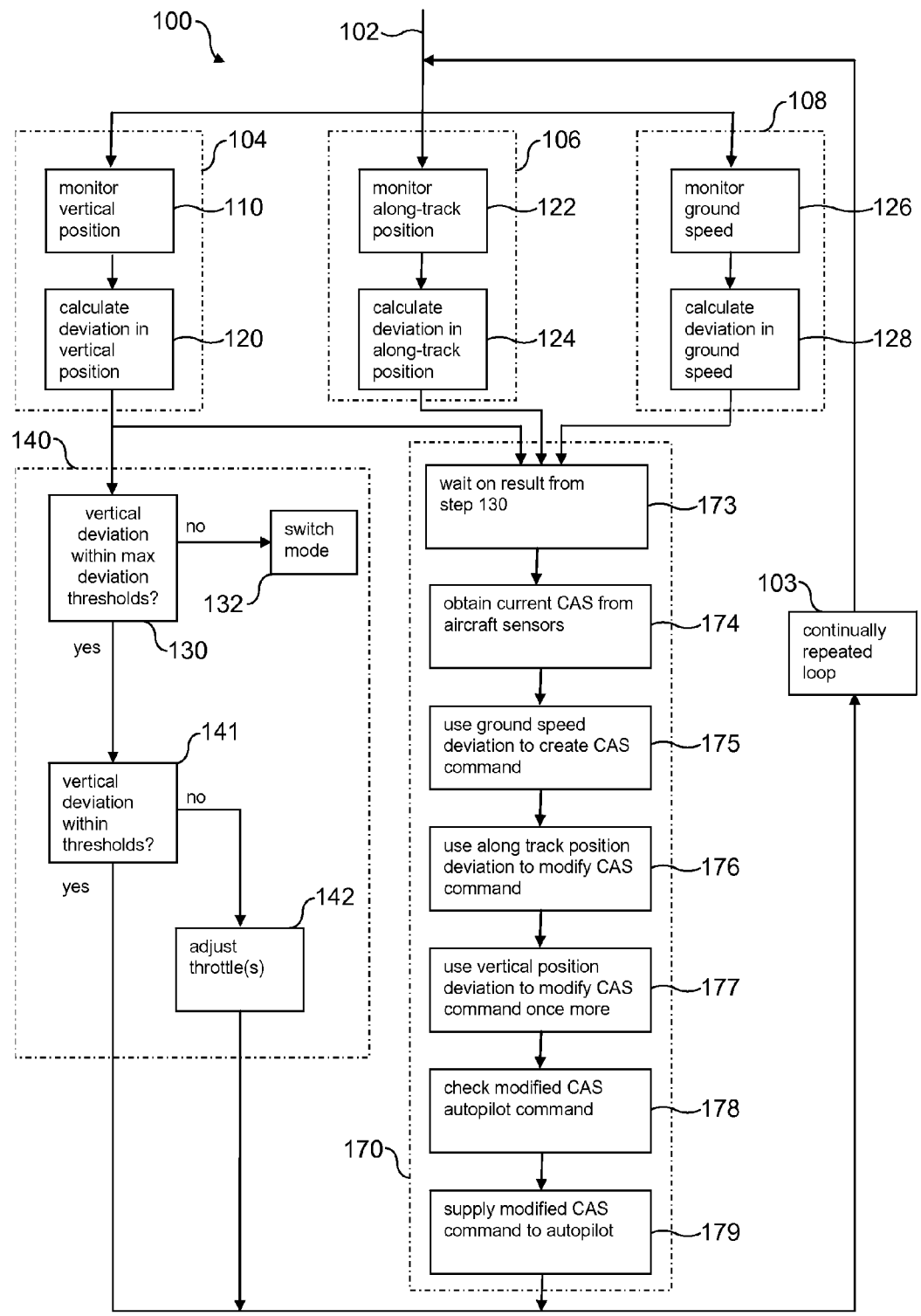
FIG. 5 is a schematic block diagram of a method of controlling the flight path of an aircraft according to a third embodiment of the present invention.
Figure 6:
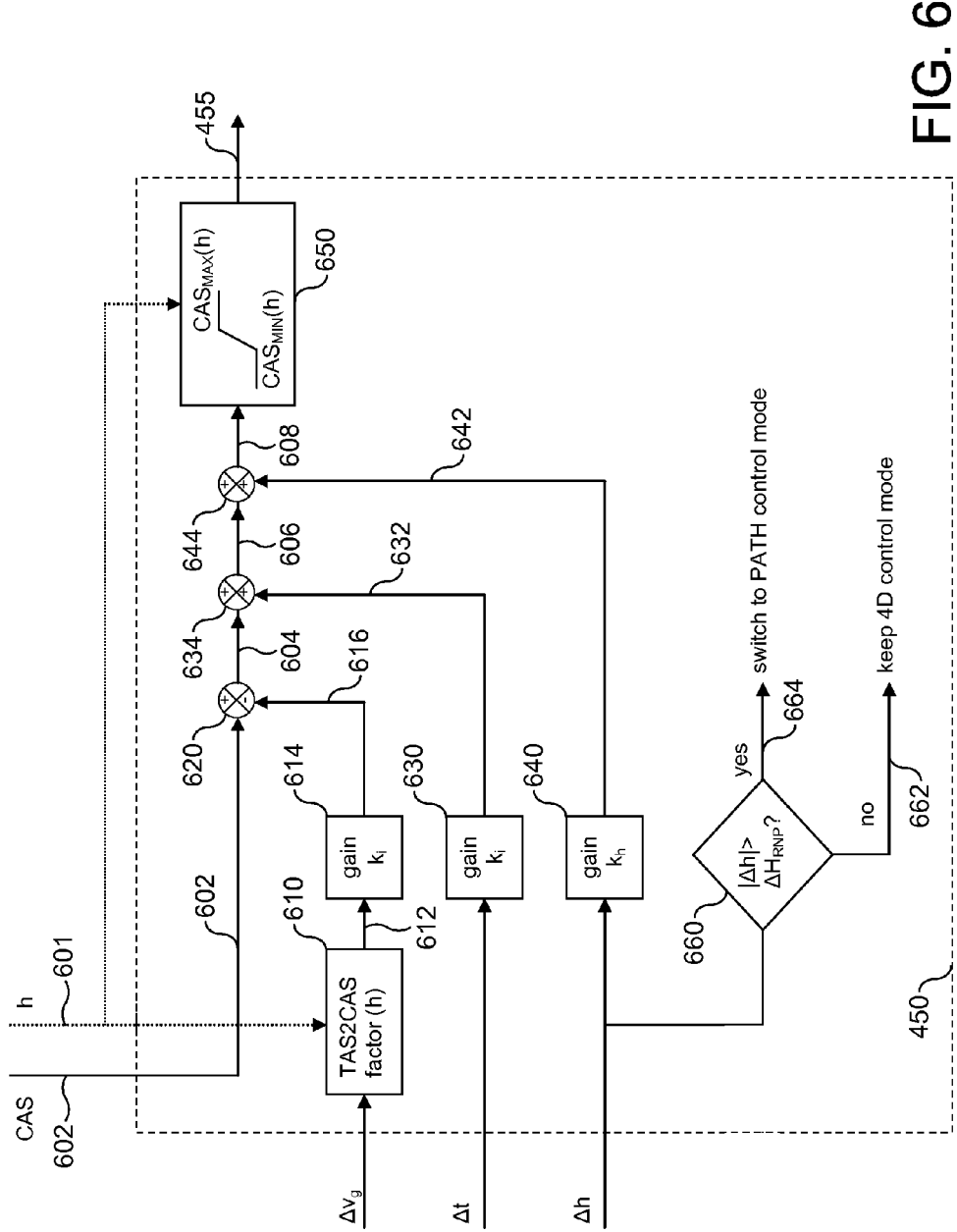
FIG. 6 is a schematic diagram of an autopilot signal generator for use with embodiments of the present invention.

FIG. 5 is adapted from FIG. 1, and common reference numerals indicate common features. The optional parallel process 108 is assumed to be present in the method of FIG. 5. Hence, FIG. 5 shows a method of controlling an aircraft 200 to follow a predetermined four-dimensional flight path. The method is modified to include further safety features. FIG. 6 shows an embodiment of the autopilot signal generator 450 of FIG. 4 that includes means for effecting the safety features of FIG. 5.

Once the deviations in vertical position, along track position and ground speed have been determined at steps 120, 124 and 128, the method continues to step 130. At step 130, the deviation in vertical position is compared to a maximum deviation threshold. For example, the maximum deviation threshold may be some limit imposed by air traffic control. Typically, the maximum deviation threshold will depend upon the manoeuvre being flown. During a continuous descent approach, the maximum deviation threshold may correspond to an imposed required navigation performance (RNP), which may take a value of 200 feet or so. It is stressed that the maximum deviation threshold is not the same as the throttle change thresholds. In fact, the throttle change thresholds should be significantly smaller, e.g. 100 feet, as throttle changes should generally take effect in order to avoid deviations in the vertical position greater than the maximum deviation threshold.

If, at 130, the determination indicates that the deviation in vertical position has grown to be outside the maximum deviation threshold, the current method of flight guidance 100 is terminated at step 132 where there is a switch mode to another control law, e.g. one with a vertically constrained path. If the determination at 130 finds that the aircraft 200 is still within the maximum deviation threshold for vertical position deviation, the method continues to step 141. At step 141, the deviation in vertical position is compared with the throttle-change thresholds to determine whether the throttle setting should be adjusted at 142, as has been described previously.

The adjust elevator(s) process 170 contains a new first step at 173. Here, a delay is introduced (where required) to ensure that the result of the switch mode determination at step 130 is made before the method can continue to step 174.

At step 174, the aircraft's current CAS is obtained from flight data. The aircraft's current CAS is shown at 602 in FIG. 6. At step 175, the deviation in ground speed is used to obtain a new CAS command. The deviation in ground speed is converted to an equivalent deviation in calibrated airspeed by converter 610 as the ratio between calibrated airspeed and true airspeed at the current altitude and airspeed. This may be represented as $$\Delta CAS_1 = -k_c \cdot f(CAS, h) \cdot \Delta v_{GS}(s).$$

The converter 610 thus requires the altitude of the aircraft 200, and the current altitude is provided as indicated at 601. This produces an output 612 that is passed to a multiplier 614 where the deviation in calibrated airspeed is scaled by the gain factor $k_c$ appearing in the above equation. A gain factor of unity has been found to work well, such that the deviation in calibrated airspeed is equal to but of opposite sign to the deviation in ground speed. The scaled deviation in calibrated airspeed 616 is passed to a subtractor 620 where it is subtracted from the aircraft's current CAS 602 to form the new CAS command 604.

The next step in the method 100 is to use the deviation in along-track position to modify the CAS command, as indicated at 176 in FIG. 5. In this embodiment, a time error $\Delta t$ is used, i.e., how early or late the aircraft 200 reached its current position. This time error is scaled by multiplier 630 where the time error is multiplied by a gain factor $k_i$. Thus $$\Delta CAS_2 = k_i \cdot \Delta t(s).$$

The gain factor $k_i$ is chosen to be small, such as 1 knot of correction per second of time deviation. A gradual elimination of the time deviation results. The scaled time error 632 is passed to an adder 634. Added 634 adds the scaled timer error 632 to the CAS command 604 to form a once-modified CAS command 606.

The method continues to step 177 where the deviation in vertical position is used to modify the CAS command. As shown in FIG. 6, the deviation in vertical height $\Delta h$ is passed to a multiplier 640 where it is multiplied by a gain factor $k_h$ to provide a scaled deviation in vertical position 642. Thus $$\Delta CAS_3 = k_h \cdot \Delta h(s).$$

A value of the order of 1 knot per 50 feet of deviation has been found to be acceptable for $k_h$. The output 642 is passed to an adder 644 where it is added to the once-modified CAS command 606. As a result, the adder 644 produces a twice-modified CAS command 608 as its output.

At step 178, the twice-modified CAS command 608 is checked to ensure it is within desired limits. This is performed by filter 650. Filter 650 compares the twice-modified CAS command 608 to upper and lower limits $CAS_{MAX}(h)$ and $CAS_{MIN}(h)$. These limits may be chosen as appropriate, and may vary according to the current flying conditions and configuration of the aircraft 200. For example, an upper limit of 340 knots or Mach 0.82 (whichever is less) may be used for a given aircraft, reduced to 250 knots when at an altitude of 10000 feet or less (as is required in European skies). A smooth transition may be implemented between these two upper limits that varies linearly with altitude. Additionally, a minimum limit equal to the minimum manoeuvre speed for the current configuration of the aircraft 200 may be set.

The twice-modified CAS command is left unaltered if it is within these limits. Alternatively, the filter 650 limits the twice-modified CAS command 608 to whichever limit $CAS_{MAX}(h)$ or $CAS_{MIN}(h)$ is exceeded. The output from filter 650 becomes the CAS command 455 that is provided to the autopilot, as indicated at step 179. The method 100 then repeats via return loop 103.

Thus, the CAS command 455 provided to the autopilot reflects deviations in ground speed, along-track position and vertical position. The relative effect of each deviation may be tailored by appropriate choice of the gain factors $k_c$, $k_i$ and $k_h$. The method also includes the safety feature of ensuring that the CAS command remains within limits $CAS_{MAX}(h)$ and $CAS_{MIN}(h)$. These limits may reflect the current configuration of the aircraft and the manoeuvre being flown, as is normal for the case of preventing underspeed and overspeed.

FIG. 6 also shows a particular implementation of steps 130 and 132 of FIG. 5. The deviation in vertical position signal $\Delta h$ is provided to a comparator 660 that checks the deviation against a RNP threshold $\Delta H_{RNP}$. As explained previously, the method 100 continues if the deviation in vertical position is within the RNP threshold as indicated at 662, but switches to an alternative mode at 664 if outside of the RNP threshold.

Figure 7:
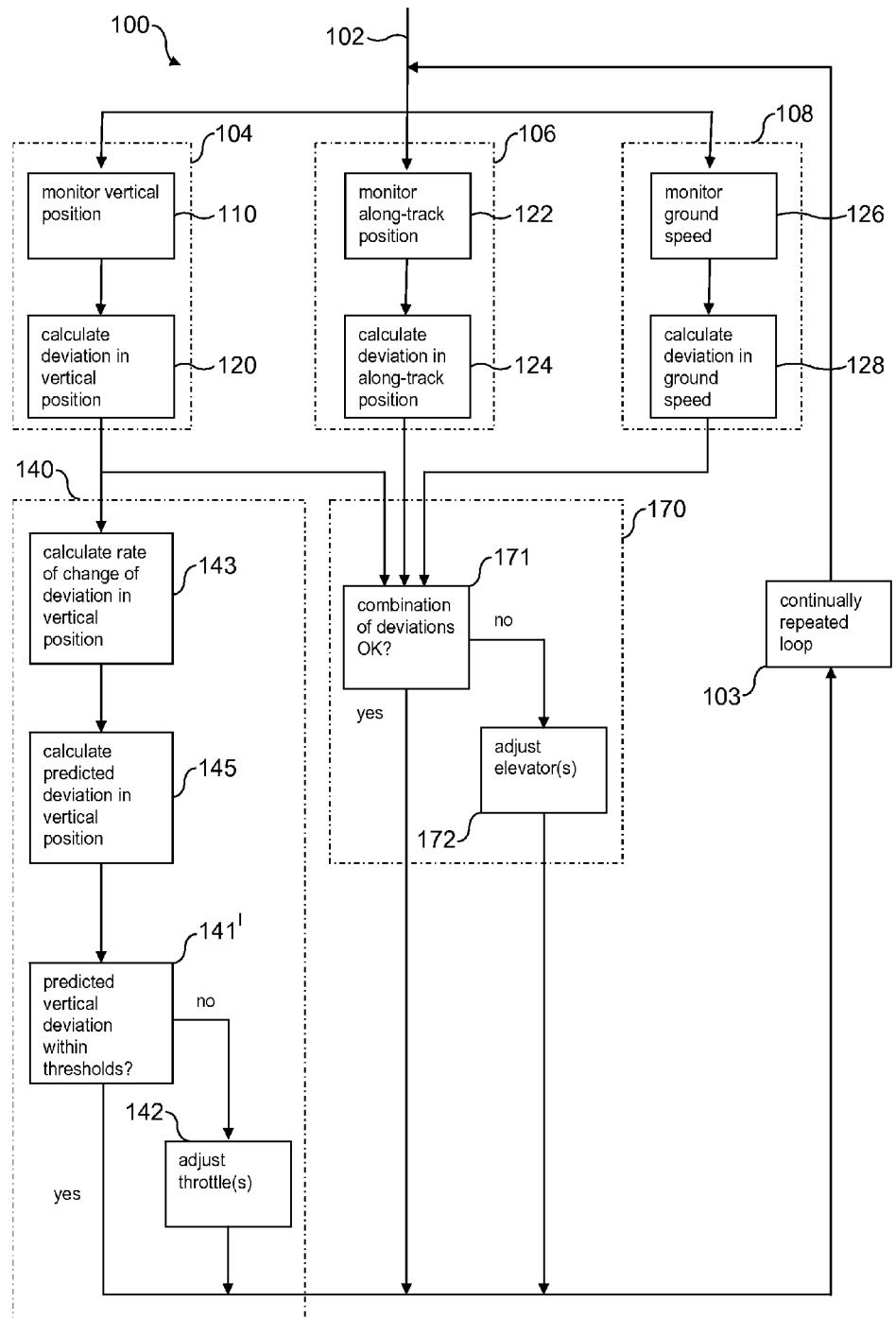
FIG. 7 is a schematic block diagram of a method of controlling the flight path of an aircraft according to a fourth embodiment of the present invention.

FIG. 7 shows a further embodiment of the method 100 of FIG. 1. Again, like reference numerals indicate like parts. FIG. 7 illustrates an improvement in the adjust throttle(s) process 140. As before, the vertical position is monitored at step 110 and the deviation in vertical position is calculated at 120. Then, in the adjust throttle(s) process 140, two further steps are introduced at 143 and 145.

At 143, the rate of change of deviation in vertical position is calculated, i.e., if $\Delta h$ is the deviation, $d\Delta h/dt$ is calculated. Then, at 145, a calculation of a predicted deviation in vertical position is made for a desired time in the future. That is to say, a predicted deviation in vertical position $\Delta h_a$ is calculated from $$\Delta h_a = \Delta h + \tau \left( \frac{d\Delta h}{dt} \right),$$

where $\tau$ is the required prediction time. A prediction time of five seconds has been found to work well.

Then, at step 140 it is the predicted deviation in vertical position that is compared to the change throttle thresholds to determine if the throttle command should be changed at 142. Thus, throttle changes are based on what the deviation in vertical position is expected to be in five seconds time. In this way, better performance is seen as the inevitable delay caused by slow throttle response is anticipated. Thus, the overshoot that would otherwise occur is mitigated. This is particularly advantageous in instances where tight tolerances in vertical position are required. For example, this may be a tight tolerance in the throttle thresholds, or it may be a tight tolerance in the maximum deviation threshold (that will then require a tight tolerance in the throttle thresholds). By using such a predictive control law, the number of throttle adjustments may also be reduced.

When using a prediction of deviation in vertical position, it is considered beneficial to compare the actual deviation in vertical position to a maximum deviation threshold, as illustrated as step 130 in FIG. 5, rather than to compare the predicted deviation in vertical position to the maximum deviation threshold.

As noted above, the present invention is particularly beneficial when used with flying continuous descent approaches. In such circumstances, the present invention ensures certainty of the position of the aircraft 200 at any particular point in time. An allowance that should be made is that the nominal throttle setting should be set to be above the idle thrust of the engines to ensure that a lower throttle $T_L$ setting is available to correct deviations above the desired vertical position.

As an example of a suitable threshold to apply when monitoring vertical position, 100 feet has been found to provide a good compromise between accuracy of position while avoiding too frequent changes to the throttle setting. With a threshold of 100 feet above and below the desired vertical position, it has been found that continuous descent approaches may be flown with typically only a few changes to the throttle setting.

It will be clear to the skilled person that variations may be made to the above embodiments without necessarily departing from the scope of the invention that is defined by the appended claims.

The invention claimed is:

1. A method of guiding an aircraft to follow a predetermined four-dimensional flight path, comprising:
   monitoring an actual along-track position and an actual vertical position of the aircraft relative to corresponding desired along-track and vertical positions on the predetermined flight path;
   generating throttle commands based on deviations of the actual vertical position of the aircraft from the desired vertical position; and
   generating elevator commands based on an along-track position deviation of the actual along-track position from the desired along-track position, a vertical position deviation of the actual vertical position from the desired vertical position, and a ground speed deviation of the actual ground speed of the aircraft from the desired ground speed of the aircraft,
   wherein said generating elevator commands comprises:
   obtaining a current calibrated airspeed from flight data;
   converting said ground speed deviation to an equivalent calibrated airspeed deviation;
   modifying said current calibrated airspeed by an amount that is a function of said calibrated airspeed deviation to form a first calibrated airspeed command;
   modifying said first calibrated airspeed command by an amount that is a function of said along-track position deviation to form a second calibrated airspeed command;
   modifying said second calibrated airspeed command by an amount that is a function of said vertical position deviation to form a third calibrated airspeed command; and
   commanding actuations of elevators in accordance with said third calibrated airspeed command.

2. The method of claim 1, further comprising generating throttle commands based on deviations of the actual vertical position of the aircraft from the desired vertical position when the actual vertical position differs from the desired vertical position by more than a threshold.

3. The method of claim 2, further comprising using the throttle commands to alter the throttle setting from a nominal value to an adjusted value.

4. The method of claim 3, wherein generating throttle commands and using the throttle commands to alter the throttle setting comprises:
   increasing the throttle setting from a nominal value to a higher value when the actual vertical position falls below the desired vertical position by a first threshold, and
   decreasing the throttle setting from the nominal value to a lower value when the actual vertical position rises above the desired vertical position by a second threshold.

5. The method of claim 4, further comprising: after altering the throttle setting and while the throttle setting is at the altered higher or lower value, continuing to monitor the actual along-track position and the actual vertical position of the aircraft relative to the corresponding desired along-track and vertical positions on the predetermined flight path; and generating throttle commands and using the throttle commands to return the throttle setting to the nominal value once the actual vertical position of the aircraft corresponds to the desired vertical position.

6. The method of claim 1, further comprising generating throttle commands based on predictions of deviations of the actual vertical position of the aircraft from the desired vertical position.

7. The method of claim 6, further comprising repeatedly calculating a predicted deviation in vertical position by: calculating the current deviation of actual vertical position from the desired vertical position, calculating the rate of change of the deviation in vertical position, multiplying the rate of change by a prediction time span, and adding the so-multiplied rate of change to the current deviation in vertical position, thereby obtaining the predicted deviation in vertical position; and
   generating a throttle command based on the predicted deviation in vertical position.

8. The method as recited in claim 1, wherein said modifying said current calibrated airspeed by an amount that is a function of said calibrated airspeed deviation comprises multiplying said calibrated airspeed deviation by a first gain factor, said modifying said first calibrated airspeed command by an amount that is a function of said along-track position deviation comprises multiplying said along-track position deviation by a second gain factor, and said modifying said second calibrated airspeed command by an amount that is a function of said vertical position deviation comprises multiplying said vertical position deviation by a third gain factor.

9. The method as recited in claim 1, wherein said generating elevator commands further comprises checking whether said third calibrated airspeed command is within a range bounded by upper and lower limits, said commanding actuations of elevators in accordance with said third calibrated airspeed occurring only if said third calibrated airspeed command is within said range.

10. A flight control computer programmed to perform the following operations:
   monitoring an actual along-track position and an actual vertical position of the aircraft relative to corresponding desired positions on the predetermined flight path;
   generating throttle commands based on deviations of the actual vertical position of the aircraft from the desired vertical position; and
   generating elevator commands based on an along-track position deviation of the actual along-track position from the desired along-track position, a vertical position deviation of the actual vertical position from the desired vertical position, and a ground speed deviation of the actual ground speed of the aircraft from the desired ground speed of the aircraft,
   wherein said generating elevator commands comprises:
   obtaining a current calibrated airspeed from flight data;
   converting said ground speed deviation to an equivalent calibrated airspeed deviation;

modifying said current calibrated airspeed by an amount that is a function of said calibrated airspeed deviation to form a first calibrated airspeed command;

modifying said first calibrated airspeed command by an amount that is a function of said along-track position deviation to form a second calibrated airspeed command;

modifying said second calibrated airspeed command by an amount that is a function of said vertical position deviation to form a third calibrated airspeed command; and commanding actuations of elevators in accordance with said third calibrated airspeed command.

11. The flight control computer of claim 10, further programmed to send instructions for throttle commands based on deviations of the actual vertical position of the aircraft from the desired vertical position when the actual vertical position differs from the desired vertical position by more than a threshold.

12. The flight control computer of claim 10, wherein said modifying said current calibrated airspeed by an amount that is a function of said calibrated airspeed deviation comprises multiplying said calibrated airspeed deviation by a first gain factor, said modifying said first calibrated airspeed command by an amount that is a function of said along-track position deviation comprises multiplying said along-track position deviation by a second gain factor, and said modifying said second calibrated airspeed command by an amount that is a function of said vertical position deviation comprises multiplying said vertical position deviation by a third gain factor.

13. The flight control computer of claim 10, wherein said generating elevator commands further comprises checking whether said third calibrated airspeed command is within a range bounded by upper and lower limits, said commanding actuations of elevators in accordance with said third calibrated airspeed occurring only if said third calibrated airspeed command is within said range.

14. A computer-implemented method of guiding an aircraft to follow a predetermined four-dimensional flight path, comprising:

monitoring an actual along-track position and an actual vertical position of the aircraft relative to corresponding desired along-track and vertical positions on the predetermined flight path;

generating throttle commands based on deviations of the actual vertical position of the aircraft from the desired vertical position; and generating elevator commands based on an along-track position deviation of the actual along-track position from the desired along-track position, a vertical position deviation of the actual vertical position from the desired vertical position, and a ground speed deviation of the actual ground speed of the aircraft from the desired ground speed of the aircraft, wherein said generating elevator commands comprises:

obtaining a current calibrated airspeed from flight data;

converting said ground speed deviation to an equivalent calibrated airspeed deviation;

modifying said current calibrated airspeed by an amount that is a function of said calibrated airspeed deviation to form a first calibrated airspeed command;

modifying said first calibrated airspeed command by an amount that is a function of said along-track position deviation to form a second calibrated airspeed command;

modifying said second calibrated airspeed command by an amount that is a function of said vertical position deviation to form a third calibrated airspeed command; and commanding actuations of elevators in accordance with said third calibrated airspeed command.

15. The computer-implemented method of claim 14, further comprising generating throttle commands based on predictions of deviations of the actual vertical position of the aircraft from the desired vertical position.

16. The computer-implemented method as recited in claim 14, wherein said modifying said current calibrated airspeed by an amount that is a function of said calibrated airspeed deviation comprises multiplying said calibrated airspeed deviation by a first gain factor, said modifying said first calibrated airspeed command by an amount that is a function of said along-track position deviation comprises multiplying said along-track position deviation by a second gain factor, and said modifying said second calibrated airspeed command by an amount that is a function of said vertical position deviation comprises multiplying said vertical position deviation by a third gain factor.

17. The computer-implemented method as recited in claim 14, wherein said generating elevator commands further comprises checking whether said third calibrated airspeed command is within a range bounded by upper and lower limits, said commanding actuations of elevators in accordance with said third calibrated airspeed occurring only if said third calibrated airspeed command is within said range.

* * * * *